United States Patent [19]

Utagawa

[11] 4,276,471
[45] Jun. 30, 1981

[54] FOCUS DETECTING DEVICE

[75] Inventor: Ken Utagawa, Yokohama, Japan

[73] Assignee: Nippon Kogaku K.K., Tokyo, Japan

[21] Appl. No.: 76,550

[22] Filed: Sep. 18, 1979

[30] Foreign Application Priority Data

Sep. 20, 1978 [JP] Japan ................. 53-114572

[51] Int. Cl.³ ............................................. G01V 1/20
[52] U.S. Cl. ................................... 250/201; 250/204
[58] Field of Search ............... 250/201, 204, 208, 209, 250/578; 354/25; 356/141, 152

[56] References Cited

U.S. PATENT DOCUMENTS

| 3,849,643 | 11/1974 | Takeda | 250/201 |
| 4,047,022 | 9/1977 | Holle | 354/25 |
| 4,191,882 | 3/1980 | Sato | 250/204 |

*Primary Examiner*—David C. Nelms
*Attorney, Agent, or Firm*—Shapiro and Shapiro

[57] ABSTRACT

A focus detecting device comprises an image forming optical system, a light beam scanning device for scanning the light beam from the image forming optical system in a predetermined direction and for generating an electrical output corresponding to the scanning direction of the light beam, an image re-forming optical system for re-forming the image formed by the image forming optical system, an image position detecting device for photoelectrically detecting the direction of movement of the image formed by the image re-forming lens, and a discriminating circuit for discriminating between the focusing, the front focus and the backward focus from the direction of movement of the image by the image re-forming optical system with respect to the direction of scanning of the light beam by the scanning optical system on the basis of the outputs of the light beam scanning device and the image position detecting device.

2 Claims, 14 Drawing Figures

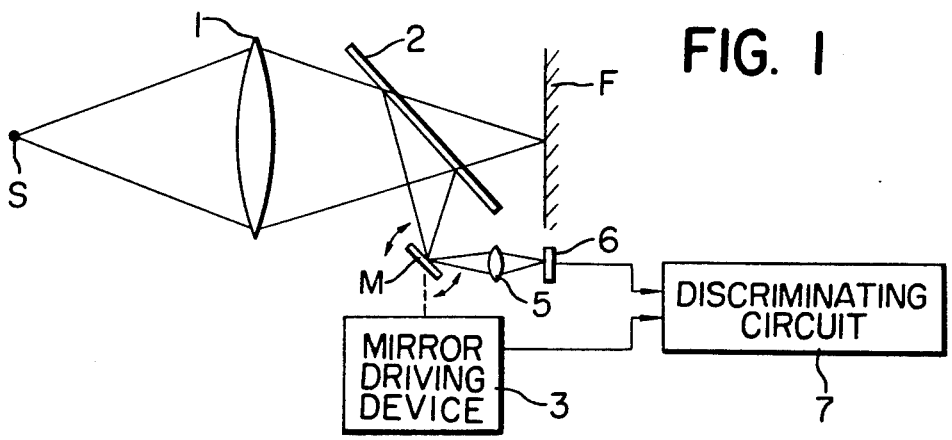
FIG. 1
FIG. 4A
FIG. 4B
FIG. 4C
FIG. 4D
FIG. 4E
FIG. 4F
FIG. 4G
FIG. 5A
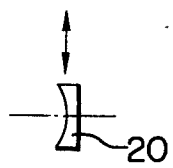
FIG. 5B
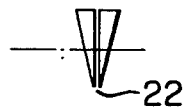

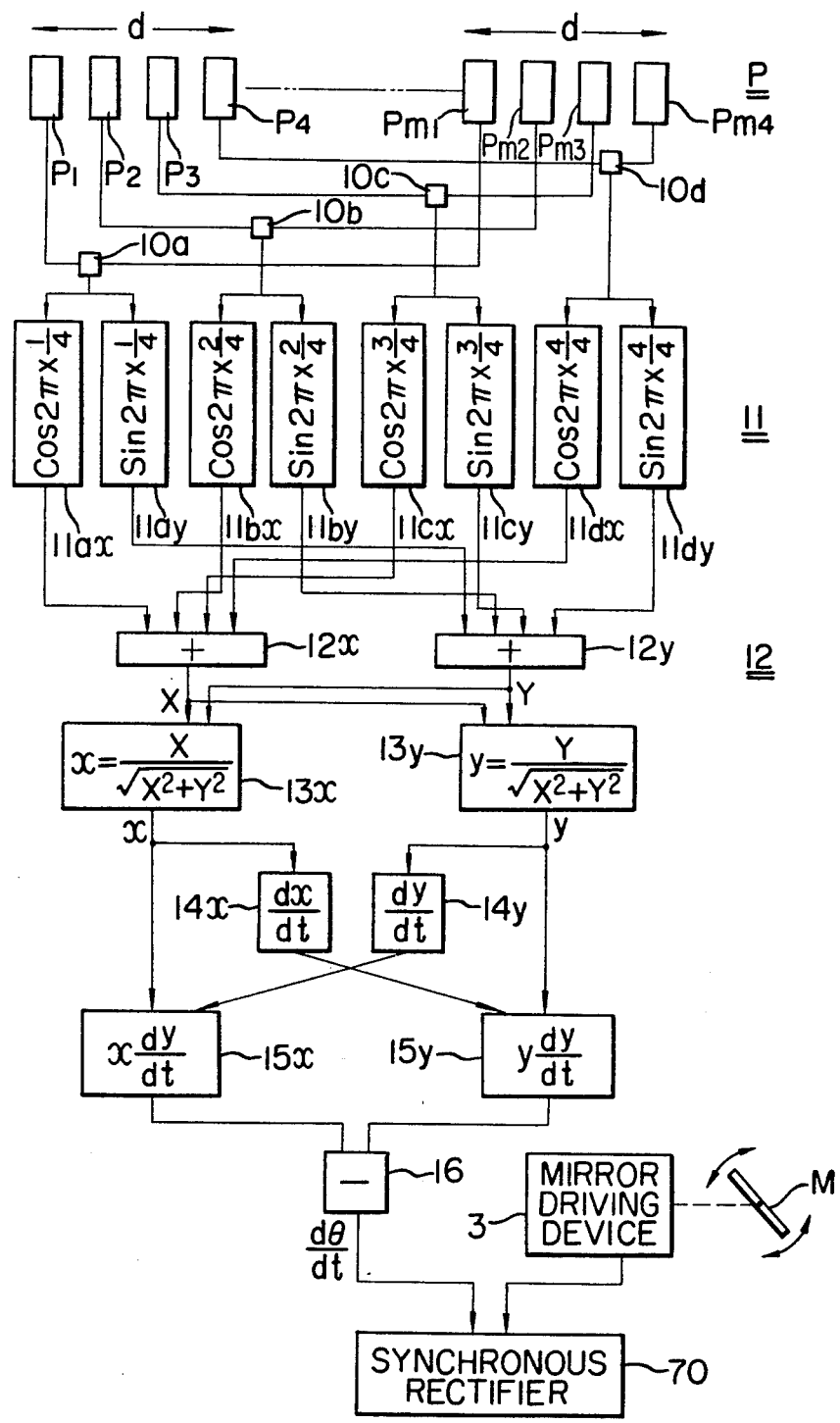

FOCUS DETECTING DEVICE

BACKGROUND OF THE INVENTION

1. Field of the Invention

This invention relates to a focus detecting device, and more particularly to a focus detecting device using a single photoelectric device.

2. Description of the Prior Art

Various focus detecting devices in which a light image is displaced on the light-receiving surface of a photoelectric device in accordance with a change of the image forming position by an image forming lens and the detection of the focus of the image forming lens is accomplished by detecting the displacement of said image have been proposed in Japanese Open Patent Application Publication No. 15432/1976 and others. The conventional device of this type has used a pair of photoelectric devices and has carried out the detection of the focus from the relative displacement of light images on the light-receiving surface of this pair of photoelectric elements. Such device has encountered the necessity of uniformizing the characteristics of the two photoelectric devices and the necessity of highly accurately arranging the two photoelectric devices in the optical system.

SUMMARY OF THE INVENTION

It is the object of the present invention to provide a focus detecting device of the described type which can carry out the focus detection by using a single photoelectric device.

Such object of the present invention is achieved by a focus detecting device comprising an image forming optical system, a light beam scanning device disposed on the fixed focal plane of the image forming optical system or on a plane conjugate therewith for scanning the light beam from the image forming optical system in a predetermined direction to move the image by the image forming optical system in a direction substantially perpendicular to the optic axis thereof and for generating an electrical output corresponding to the scanning direction of the light beam, an image re-forming optical system for forming the image by the image forming optical system, an image position detecting device disposed on the image forming plane of the image re-forming optical system for photoelectrically detecting the direction of movement of the image formed by the image re-forming lens, and a discriminating circuit for discriminating between the focusing, the front focus and the rear focus from the direction of movement of the image by the image re-forming optical system with respect to the direction of scanning of the light beam by the scanning optical system on the basis of the outputs of the light beam scanning device and the image position detecting device.

The invention will become more fully apparent from the following detailed description of embodiments thereof taken in conjunction with the accompanying drawings.

BRIEF DESCRIPTION OF THE DRAWINGS

FIG. 1 shows the construction of an embodiment of the present invention.

FIG. 3 shows an embodiment of the image position detecting device.

FIGS. 4A-4G illustrate signals for discriminating the focusing condition from $(d\theta/dt)$ and the output of a mirror driving device.

FIGS. 5A and 5B show another embodiment of the scanning device.

DESCRIPTION OF THE PREFERRED EMBODIMENTS

Figures 2A, 2B, 2C:
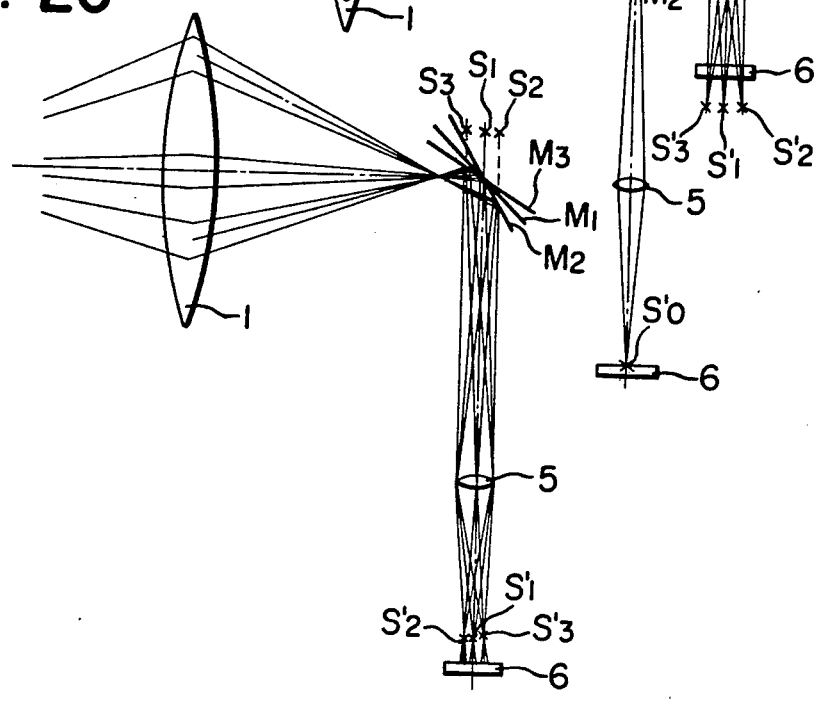
FIGS. 2A, 2B and 2C illustrate the states of movement of the light image.

Referring to FIG. 1 which shows the optical arrangement of the present invention, S designates an object, 1 an image forming lens, 2 a light path splitter, and F the fixed focal plane of the image forming lens 1.

A pivotable mirror M is disposed at a position conjugate with the fixed focal plane F with respect to the light path splitter 2 and is pivoted within a predetermined angular range. The pivot of the mirror M is coincident with a line perpendicular to the optic axis of the reflected light path of the image forming lens 1 by the light path splitter 2.

A mirror driving device 3 is for continuously pivoting the pivotable mirror M and generating an output associated with the direction of pivotal movement. The mirror driving device 3 and the pivotable mirror M together constitute a light beam scanning device.

The aperture of an image re-forming lens 5, as will hereinafter be described in detail, is determined so that the illumination of the image formed by the image re-forming lens 5 is not varied by the rotation of the mirror M.

The light-receiving surface of an image position detecting device 6 is disposed in or near the image forming plane of the image re-forming lens 5. The image position detecting device 6 may photoelectrically detect the movement of a light image projected upon the light-receiving surface in the direction perpendicular to the optic axis.

A discriminating circuit 7 may discriminate between the proper focus, the forward focus and the backward focus from the outputs of the mirror driving device 3 and the image position detecting device 6.

Reference is now had to FIGS. 2A, 2B and 2C to describe the movement of the light image of the object S on the light-receiving surface of the image position detecting device 6 which results from the pivotal movement of the mirror M. In FIGS. 2A–2C, the light path splitter 2 is eliminated and the pivotable mirror M is disposed at the position of the fixed focal plane F of FIG. 1. When the mirror M is pivoted within slight ranges $M_2$ and $M_3$ in opposite directions from the center position $M_1$ of pivotal movement at which the mirror is inclined by 45° with respect to the optic axis and scans the light passed through the image forming lens 1, the image of the object S moves in the direction substantially perpendicular to the optic axis as shown below.

(a) The case of the backward focus as shown in FIG. 2A:

(the case where the image by the image forming lens 1 is formed rearwardly of the mirror M namely fixed focal plane F)

When the mirror M is at the position $M_1$, the real image of the object S by the image forming lens 1 is formed at a position $S_1$; when the mirror M is at the position $M_2$, the real image of the object S by the image forming lens 1 is formed at a position $S_2$; and when the mirror M is at the position $M_3$, the real image of the object S by the image forming lens 1 is formed at a position $S_3$.

Also, these real images $S_1$, $S_2$ and $S_3$ are formed as $S_1'$, $S_2'$, and $S_3'$, respectively, rearwardly of the light-receiving surface of the image position detecting device 6 by the image re-forming lens 5.

Accordingly, when the mirror M is pivotally moved to the positions $M_3$, $M_1$ and $M_2$, the image on the image position detecting device 6 is rightwardly moved to the positions $S_3'$, $S_1'$ and $S_2'$ as viewed in the drawing.

(b) The case of the proper focus as shown in FIG. 2B:

During the proper focus, the image of the object S is formed at a point $S_0$ on the mirror M independently of the pivoted position of the mirror and therefore, the image by the image re-forming lens 5 is also formed at a point $S_0'$ on the image position detecting device 6.

(c) The case of the forward focus as shown in FIG. 2C:

(the case where the image is formed fowardly of the mirror M)

When the mirror M is at the position $M_1$, a virtual image is formed at the position $S_1$; when the mirror M is at the position $M_2$, a virtual image is formed at the position $S_2$; and when the mirror M is at the position $M_3$, a virtual image is formed at the position $S_3$. Real images $S_1'$, $S_2'$ and $S_3'$ are formed forwardly of the image position detecting device 6 by the image re-forming lens 5.

When the mirror M is pivotally moved to the positions $M_3$, $M_1$ and $M_2$ in the same manner as already described, the image on the image position detecting device 6 moves leftwardly to the positions $S_3'$, $S_1'$ and $S_2'$, conversely to the case of the backward focus.

Thus, between the forward focus and the backward focus, the direction of movement of the image on the image position detecting device 6 is reverse with respect to the direction of pivotal movement of the mirror, namely, the scanning direction and during the proper focus, the image is stationary, whereby discrimination can be made between the forward focus, the backward focus and the proper focus.

In FIG. 1, the discriminating circuit 7 discriminates between the proper focus the backward focus and the forward focus from the output of the mirror driving device 3 representing the scanning direction of the mirror M and the output of the image position detecting device 6 representing the direction of movement of the image. If the output of the discriminating circuit 7 is applied to a display device, the focusing condition can be displayed and if the output of the discriminating circuit 7 is applied to a servo system for driving the image forming lens 1, an automatic focus can be achieved.

The aperture of the image re-forming lens 5 will now be described. In FIG. 2A, the aperture of the image re-forming lens 5 is determined such that when the mirror M is at the center position $M_1$ of pivotal movement, only a light beam $L_1$ passes through the image re-forming lens 5 and is concerned with the formation of the image $S_1'$, that when the mirror M is at one end $M_2$ of pivotal movement, only a light beam $L_2$ equal in quantity to the light beam $L_1$ passes through the image re-forming lens 5 and is concerned with the formation of the image $S_2'$, and that when the mirror M is at the other end $M_3$ of pivotal movement, only a light beam $L_3$ equal in quantity to the light beam $L_1$ passes through the image re-forming lens 5 and is concerned with the formation of the image $S_3'$. By this, the images $S_1'$, $S_2'$ and $S_3'$ can be made equal in brightness.

A specific example of the image position detecting device will be described by reference to FIG. 3.

Designated by $P_1-P_4$ and $P_{m1}-P_{m4}$ are photoelectric elements. These constitute a photoelectric element array P in which the photoelectric elements are arrayed on the light-receiving surface of the image position detecting device 6 in the direction perpendicular to the optic axis of the image re-forming lens 5. Each four elements $P_1-P_4$ and $P_{m1}-P_{m4}$ constitute a element group. The spatial length of this element group is d. In FIG. 3, only two element groups are shown typically.

An adder 10a adds the outputs of the first photoelectric elements $P_1-P_{m1}$ of the respective element groups. Adders 10b, 10c and 10d respectively add the outputs of the second, the third and the fourth elements of the respective element groups.

A vectorizing circuit 11 comprises multipliers 11ax, 11ay, 11bx, 11by, 11cx, 11cy, 11dx and 11dy. A pair of multipliers 11ax and 11ay multiply the output of the adder 10a by the x component $\cos 2\pi \times \frac{1}{4}$ and y component $\sin 2\pi \times \frac{1}{4}$ of a vector having an argument or phase of $2\pi \times \frac{1}{4}$ and convert the output of the adder 10a, namely, the outputs of the first elements of the respective element groups, into a vector having a phase of $2\pi \times \frac{1}{4}$. Likewise, pairs of multipliers 11bx and 11by, 11cx and 11cy, 11dx and 11dy respectively multiply the outputs of the adders 10b, 10c and 10d by the x components and y components of vectors having phases of $2\pi \times (2/4)$, $2\pi \times \frac{3}{4}$ and $2\pi \times (4/4)$ and convert said outputs into the vectors having said phases.

Adder means 12 comprises adders 12X and 12Y. The adder 12X adds the outputs of the multipliers 11ax, 11bx, 11cx and 11dx multiplied by the x component, and the adder 12Y adds the outputs of the multipliers 11ay, 11by, 11cy and 11dy multiplied by the y component. That is, the output x of the adder 12X and the output Y of the adder 12Y are the x component and y component of the combined vector of the vectorized outputs of the elements $P_1-P_4$ and $P_{m1}-P_{m4}$. The magnitude of this combined vector, as described in detail in the inventor's U.S. application Ser. No. 972,261, represents the magnitude of the spatial frequency component of a spatial period d contained in the light image, and the argument $\theta$ of the combined vector has the following property. The vector determined by x and y has its argument $\theta = \tan^{-1} Y/X$ increased or decreased in accordance with the displacement of the light image on the array P in the direction of array of the array. Accordingly, by detecting whether the argument $\theta$ of the combined vector has increased or decreased, the rightward or leftward movement of the light image on the array can be discriminated. The increase or decrease of this argument $\theta$ can be known by the positive or the negative of $(d\theta/dt)$ which results from differentiating $\theta$ by time. This $(d\theta/dt)$ may be expressed by X and Y, as follows:

$$\text{from } \tan\theta = \frac{Y}{X}, \quad \frac{1}{\cos^2\theta} \frac{d\theta}{dt} = \frac{X\frac{dY}{dt} - Y\frac{dX}{dt}}{X^2}$$

$$\therefore \frac{d\theta}{dt} = \frac{X\frac{dY}{dt} - Y\frac{dX}{dt}}{X^2 + Y^2}$$

Since the values of X and Y depend on the brightness of the object S as well, $d\theta/dt$ also depends on the brightness of the object. To avoid this, if $$x = \frac{X}{\sqrt{X^2 + Y^2}}$$

and $$y = \frac{Y}{\sqrt{X^2 + Y^2}},$$

the foregoing equation may be expressed as $$\frac{d\theta}{dt} = x\frac{dy}{dt} - y\frac{dx}{dt}.$$

The operation for obtaining ($d\theta/dt$) is carried out by the following circuits.

An operation circuit 13x obtains x from the output X of the adder circuit 12x and the output Y of the adder circuit 12y.

An operation circuit 13y obtains y from X and Y.

A differentiation circuit 14x differentiates x by time t.

A differentiation circuit 14y differentiates y by time t.

A multiplier circuit 15x obtains the product of the output of the circuit 13x and the output of the circuit 14y.

A multiplier circuit 15y obtains the product of the output of the circuit 13y and the output of the circuit 14x.

A subtraction circuit 16 obtains (the output of the circuit 15x)−(the output of the circuit 15y).

Reference is now had to FIG. 4 to describe the method of discriminating the focusing condition from $d\theta/dt$ obtained as the result of the processes by the above-mentioned circuits and the output of the mirror driving device.

FIG. 4A shows the waveform of the output of the mirror driving device 3 when the mirror M is vibrated to positions M₃, M₁, M₂, M₁ and M₃. M₃, M₁ and M₂ given on the abscissa which is the time axis illustrate, for convenience, the relation between the waveform and the mirror position.

Case of the backward focus:

When, as shown in FIG. 2A, the light image is moved rightwardly by the pivotal movement of the mirror M from the position M₃ to the position M₂ and the light image is moved leftwardly by the pivotal movement of the mirror from the position M₂ to the position M₃, it is to be understood that $d\theta/dt$ in FIG. 4B is a sine wave output of the same phase as FIG. 4A. When $d\theta/dt$ is synchronously rectified by the shynchronous rectifier 70 of FIG. 3 which acts as the discriminator 7, with the output of the mirror driving device as the reference signal, the output of the synchronous rectifier 70 becomes a positive value representing the backward focus, as shown in FIG. 4C.

Case of the proper focus:

Since the light image is stationary, $d\theta/dt=0$. (FIG. 4D). Accordingly, the output of the synchronous rectifier 70 also becomes zero as shown in FIG. 4E.

Case of the forward focus:

Since the direction of movement of the image is reverse to the case of the backward focus with respect to the direction of pivotal movement of the mirror M, $d\theta/dt$ in FIG. 4F becomes opposite in phase to FIG. 4A. Accordingly, the output of the synchronous rectifier 70 becomes negative, as shown in FIG. 4G.

Thus, the backward focus can be discriminated when the output of the synchronous rectifier 70 is positive, the proper focus can be discriminated when the output of the synchronous rectifier 70 is zero, and the forward focus can be discriminated when the output of the synchronous rectifier 70 is negative.

Other various devices than the pivotable mirror are conceivable as the device for causing the light image by the image forming lens 1 to be scanned in the direction substantially perpendicular to the optic axis. For example, as shown in FIG. 5A, a concave lens 20 acting as a prism may be disposed on the fixed focal plane of the image forming lens 1 and may be reciprocally moved in a direction perpendicular to the optic axis, or as shown in FIG. 5B, a pair of rotary prisms 22 may be provided and rotated.

The effect of the present invention lies in that focus detection becomes possible by a single photoelectric device and that a practically useful focus detecting device can be provided without the problem of uniforming the characteristics of two photoelectric devices or the problem of highly accurate arrangement thereof.

I claim:

1. A focus detecting device comprising:
    an image forming optical system;
    a light beam scanning device disposed on the fixed focal plane of said image forming optical system or on a plane conjugate therewith for scanning the light beam from said image forming optical system in a predetermined direction to move the image by said image forming optical system in a direction substantially perpendicular to the optic axis thereof and for generating an electrical output corresponding to the scanning direction of the light beam;
    an image re-forming optical system for re-forming the image formed by said image forming optical system;
    an image position detecting device disposed on the image forming plane of said image re-forming optical system for photoelectrically detecting the direction of movement of the image formed by said image re-forming lens; and
    a discriminating circuit for discriminating between the proper focus, the forward focus and the backward focus from the direction of movement of the image by said image re-forming optical system with respect to the direction of scanning of the light beam by said scanning optical system on the basis of the outputs of said light beam scanning device and said image position detecting device.

2. A focus detecting device according to claim 1, wherein said image position detecting device comprises:
    a photoelectric element array consisting of photoelectric elements arrayed in the direction of movement of the image formed by said image re-forming lens;
    a vectorizing circuit for converting the output of each of the photoelectric elements of said array into a phase-increasing vector in the order of array of said elements;
    an adder circuit for adding said vectors; and
    a phase detecting circuit for detecting an increase or decrease in phase of the combined vector output of said adder circuit.

* * * * *